(12) United States Patent
Goodwin (10) Patent No.: US 9,114,572 B2
(45) Date of Patent: Aug. 25, 2015

(54) METHOD OF POST-MOLD CROSSLINKING THERMOPLASTIC POLYURETHANE GOLF BALL COVER COMPOSITIONS

(71) Applicant: NIKE, Inc., Beaverton, OR (US)

(72) Inventor: David A. Goodwin, Bothell, WA (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/230,314

(22) Filed: Mar. 31, 2014

(65) Prior Publication Data

US 2014/0210142 A1 Jul. 31, 2014

Related U.S. Application Data

(62) Division of application No. 12/560,654, filed on Sep. 16, 2009, now abandoned.

(51) Int. Cl.
| | |
|---|---|
| *B29C 71/04* | (2006.01) |
| *A63B 37/00* | (2006.01) |
| *A63B 45/00* | (2006.01) |
| *B29D 99/00* | (2010.01) |
| *B29L 31/54* | (2006.01) |

(52) U.S. Cl.
CPC ............ *B29C 71/04* (2013.01); *A63B 37/0003* (2013.01); *A63B 37/0039* (2013.01); *A63B 37/0076* (2013.01); *A63B 45/00* (2013.01); *B29D 99/0042* (2013.01); *B29L 2031/54* (2013.01)

(58) Field of Classification Search
CPC ............ A63B 37/003; A63B 37/0039; A63B 37/0076; A63B 45/00; B29C 71/04; B29D 99/0042
See application file for complete search history.

(56) References Cited

U.S. PATENT DOCUMENTS

| | | | |
|---|---|---|---|
| 5,857,925 A * | 1/1999 | Sullivan et al. | ............... 473/374 |
| 6,165,564 A * | 12/2000 | Crast et al. | .................... 427/517 |
| 6,369,125 B1 | 4/2002 | Nesbitt | |
| 6,787,582 B2 | 9/2004 | Nesbitt | |
| 7,048,651 B2 | 5/2006 | Kennedy, III et al. | |
| 7,148,266 B2 | 12/2006 | Nesbitt et al. | |
| 7,198,576 B2 | 4/2007 | Sullivan et al. | |

(Continued)

FOREIGN PATENT DOCUMENTS

| | | |
|---|---|---|
| CN | 101005933 A | 7/2007 |
| CN | 101128241 A | 2/2008 |

(Continued)

OTHER PUBLICATIONS

European Search Report for EP 10173125 completed on Nov. 16, 2010.

(Continued)

*Primary Examiner* — Elena T Lightfoot
(74) *Attorney, Agent, or Firm* — Banner & Witcoff, Ltd.

(57) ABSTRACT

A multi-piece golf ball is manufactured by molding a cover layer and a core layer to form a golf ball preform in a mold. The cover layer has a thermoplastic polyurethane composition which may be crosslinked by ultraviolet radiation. After molding, the golf ball preform is removed from the mold. A UV curable topcoat composition is applied to the golf ball preform. The golf ball preform is then irradiated with ultraviolet radiation under conditions sufficient to both crosslink the crosslinkable thermoplastic polyurethane and cure the UV curable topcoat composition.

7 Claims, 4 Drawing Sheets

(56) References Cited

U.S. PATENT DOCUMENTS

| | | |
|---|---|---|
| 7,371,435 B2 | 5/2008 | Ohira |
| 2001/0036870 A1 | 11/2001 | Pettigrew et al. |
| 2002/0016226 A1 | 2/2002 | Jin et al. |
| 2002/0032080 A1* | 3/2002 | Hebert et al. ............... 473/374 |
| 2002/0120068 A1 | 8/2002 | Soane et al. |
| 2003/0225222 A1 | 12/2003 | Sullivan et al. |
| 2004/0053707 A1 | 3/2004 | Ohira |
| 2004/0059062 A1 | 3/2004 | Kim |
| 2004/0176531 A1 | 9/2004 | Morgan et al. |
| 2006/0167168 A1 | 7/2006 | Suzuki et al. |
| 2007/0100089 A1 | 5/2007 | Nesbitt et al. |
| 2007/0142127 A1 | 6/2007 | Tarao |
| 2008/0051233 A1 | 2/2008 | Nesbitt et al. |
| 2009/0221387 A1 | 9/2009 | Ohama et al. |
| 2013/0165245 A1 | 6/2013 | Molinari et al. |

FOREIGN PATENT DOCUMENTS

| | | |
|---|---|---|
| JP | 07-313632 | 12/1995 |
| JP | 2001-327632 A | 11/2001 |
| JP | 2002322417 A | 11/2002 |
| JP | 2003524453 A | 8/2003 |
| JP | 200424834 A | 1/2004 |
| JP | 2004107485 A | 4/2004 |
| JP | 2004113782 A | 4/2004 |
| JP | 2004130111 A | 4/2004 |
| WO | 0038793 | 7/2000 |
| WO | 2007144292 A1 | 12/2007 |

OTHER PUBLICATIONS

Office Action for corresponding Chinese Application 201010272477.7 dated Aug. 3, 2012.

Japanese Office Action, issued Dec. 27, 2010, for Japanese Patent Application No. 2010-181278, along with an English translation.

Japanese Office Action, issued Jun. 2, 2011, for Japanese Patent Application No. 2010-181278, along with an English translation.

Notice of Reasons for Rejection mailed Jun. 2, 2011 in Japanese Patent Application No. 2010-181278.

\* cited by examiner

METHOD OF POST-MOLD CROSSLINKING THERMOPLASTIC POLYURETHANE GOLF BALL COVER COMPOSITIONS

CROSS REFERENCE TO RELATED APPLICATION

This application is a division of application Ser. No. 12/560,654, filed Sep. 16, 2009, now abandoned, the disclosure of which is hereby incorporated by reference in its entirety.

BACKGROUND

Golf balls generally have either a one-piece construction or several layers including an outer cover surrounding a core. A wound ball configuration typically has a vulcanized rubber thread wound under tension around a solid or semi-solid core, which is then enclosed in a single or multi-layer covering of tough, protective material. Another type of ball, a one-piece ball, typically formed from a solid mass of moldable resilient material which has been cured to develop the necessary degree of hardness. One-piece molded balls generally do not have an enclosing cover. Multi-piece (two or more pieces) non-wound balls generally have a solid or liquid core of one or more layers, and a cover having one or more layers formed over the core.

Many multi-piece golf balls have a cover containing an ionomer resin to impart toughness and cut resistance. Examples of such ionomers include Surlyn®, available from E.I. DuPont de Nemours and Company, and Iotek®, available from Exxon-Mobil.

Polyurethanes also have been used in cover materials of multi-piece golf balls.

Polyurethanes may be formed by mixing two primary ingredients during processing, most commonly a polyisocyanate, e.g., diphenylmethane diisocyanate monomer, toluene diisocyanate, or their derivatives, and a polyol, e.g., a polyester- or polyether polyol. An isocyanate that is reacted with a polyamine forms a polyurea. The term "polyurethane" is often used to describe polyurethane/polyurea systems. Polyurethanes may be thermoset, e.g., having a crosslinked molecular structure, or thermoplastic, e.g., having a linear molecular structure. A polyurethane becomes irreversibly "set" when a polyurethane prepolymer is crosslinked with a polyfunctional curing agent, such as a polyamine or polyol. The prepolymer typically is made from polyether or polyester. Crosslinking occurs between the isocyanate groups and the hydroxyl end-groups of the polyol. The physical properties of thermoset polyurethanes may be adjusted by the degree of crosslinking. For example, tightly crosslinked polyurethanes are fairly rigid and strong, whereas a lower level of crosslinking results in materials that are flexible and resilient. Depending upon the processing method, reaction rates may be quite fast, e.g., as in the case for some reaction injection molding (RIM) systems, or in other cases may be several hours or longer, e.g., as in several coating systems.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention are directed to methods of preparing multi-piece golf balls. In one example, a multi-piece golf ball is prepared by providing a core layer and a cover layer. The cover layer includes a crosslinkable thermoplastic polyurethane. The cover layer and core layer are molded into a golf ball preform. Any suitable molding technique may be used such as injection molding, compression molding, retractable pin injection molding, vacuum forming, reaction injection molding, liquid injection molding, flow coating, and the like. The golf ball preform is removed from the mold. The golf ball preform is then irradiated under conditions sufficient to crosslink the crosslinkable thermoplastic polyurethane. In some embodiments, one or more intermediate layers are present between the core layer and the cover layer, and/or the core may have a multi-layer construction and/or the core may have a multi-layer construction.

In another aspect, a multi-piece golf ball is prepared by molding a cover layer and a core layer to form a golf ball preform in a mold. The cover layer includes a crosslinkable thermoplastic polyurethane. The golf ball preform is removed from the mold and stored for at least one day. Demand for particular golf ball properties and/or performance characteristics are then determined. The golf ball preform is then irradiated to crosslink the crosslinkable thermoplastic polyurethane to achieve the desired golf ball properties and/or performance characteristics.

In yet another aspect, a multi-piece golf ball is prepared by providing a core layer and a cover layer. The cover layer includes a crosslinkable thermoplastic polyurethane. The cover layer and core layer are molded into a golf ball preform, and removed from the mold. An ultraviolet curable topcoat composition is applied to the exterior surface of the golf ball preform. The golf ball preform is then irradiated with ultraviolet radiation to simultaneously crosslink the crosslinkable thermoplastic polyurethane and cure the UV curable topcoat composition.

BRIEF DESCRIPTION OF THE DRAWINGS

A more complete understanding of the present invention and certain advantages thereof may be acquired by referring to the following detailed description in consideration with the accompanying drawings, in which.

DETAILED DESCRIPTION

In the following description of various example structures, reference is made to the accompanying drawings, which form a part hereof, and in which are shown by way of illustration various example golf ball structures. Additionally, it is to be understood that other specific arrangements of parts and structures may be utilized and structural and functional modifications may be made without departing from the scope of the present invention. Also, while terms such as "top," "bottom," "front," "back," "rear," "side," "underside," "overhead,"

and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures.

A. General Description of Golf Balls and Manufacturing Systems and Methods

Golf balls may be of varied constructions, e.g., one-piece balls, two-piece balls, three-piece balls (including wound balls), four-piece balls, etc. The difference in play characteristics resulting from these different types of constructions can be quite significant. Generally, golf balls may be classified as solid or wound balls. Solid balls that have a two-piece construction, typically a cross-linked rubber core, e.g., polybutadiene rubber cross-linked with zinc diacrylate and/or similar cross-linking agents, encased by a blended cover, e.g., ionomer resins, are popular with many average recreational golfers. The combination of the core and cover materials provide a relatively "hard" ball that is virtually indestructible by golfers and one that imparts a high initial velocity to the ball, resulting in improved distance. Because the materials of which the ball is formed are very rigid, two-piece balls tend to have a hard "feel" when struck with a club. Likewise, due to their hardness, these balls have a relatively low spin rate off the driver, which also helps provide greater distance.

Wound balls are generally constructed from a liquid or solid center surrounded by tensioned elastomeric material and covered with a durable cover material, e.g., ionomer resin, or a softer cover material, e.g., balata or polyurethane. Wound balls are generally thought of as performance golf balls and have good resiliency, desirable spin characteristics, and feel when struck by a golf club. However, wound balls are generally difficult to manufacture as compared to solid golf balls.

More recently, three- and four-piece balls have gained popularity, both as balls for average recreational golfers as well as performance balls for professional and other elite level players.

A variety of golf balls have been designed to provide particular playing characteristics. These characteristics generally include the initial velocity and spin of the golf ball, which can be optimized for various types of players. For instance, certain players prefer a ball that has a high spin rate in order to control and stop the golf ball around the greens. Other players prefer a ball that has a low spin rate and high resiliency to maximize distance. Generally, a golf ball having a hard core and a soft cover will have a high spin rate. Conversely, a golf ball having a hard cover and a soft core will have a low spin rate. Golf balls having a hard core and a hard cover generally have very high resiliency for distance, but are hard feeling and difficult to control around the greens.

The carry distance of some conventional two-piece balls has been improved by altering the typical single layer core and single cover layer construction to provide a multi-layer ball, e.g., a dual cover layer, a dual core layer, and/or a ball having an intermediate layer disposed between the cover and the core (also called a "mantle" layer). Three- and four-piece balls (and even five-piece balls) are now commonly found and commercially available. Aspects of this invention may be applied to all types of constructions, including the various wound, solid, and/or multi-layer ball constructions with any number of layers described above.

Figure 1:
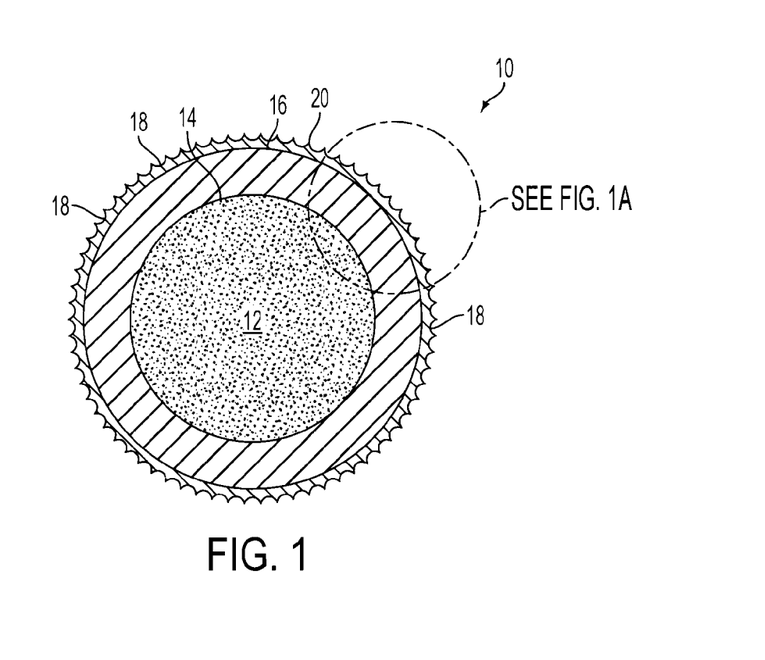
FIGS. 1 and 1A schematically illustrate a cross-sectional view of a multi-piece golf ball.
Figure 1A:
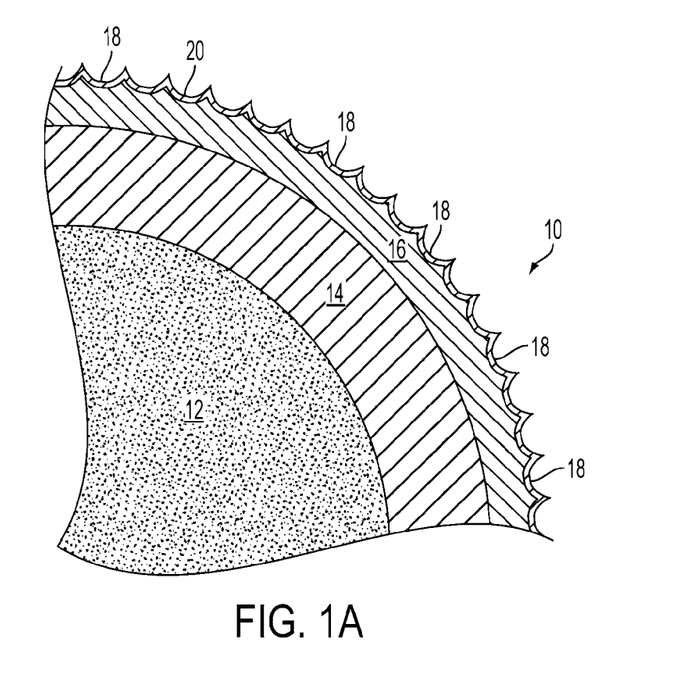

FIGS. 1 and 1A show an example of a golf ball 10, which has a core 12, an intermediate layer 14, a cover 16 having a plurality of dimples 18, and a topcoat 20 applied over the exterior surface of the golf ball 10. The ball 10 also may have any other construction, including the various example constructions described herein. The thickness of the topcoat 20 typically is significantly less than that of the cover 16 or the intermediate layer 14, and by way of example may range from about 5 to about 25 µm. The topcoat 20 should have a minimal effect on the depth and volume of the dimples 18.

The cover 16 of the golf ball 10 may be made of any number of materials such as, but not limited to, ionomeric, thermoplastic, elastomeric, urethane, balata (natural or synthetic), polybutadiene, or combinations thereof. As described below, at least one layer of the cover 16 contains a crosslinkable thermoplastic polyurethane. An optional primer or basecoat may be applied to the exterior surface of the cover 16 of the golf ball 10 prior to application of the coating layer 20.

The Center

A golf ball may be formed, for example, with a center having a low compression, but still exhibit a finished ball COR and initial velocity approaching that of conventional two-piece distance balls. The center may have, for example, a compression of about 60 or less. The finished balls made with such centers have a COR, measured at an inbound speed of 125 ft./s., of about 0.795 to about 0.815. "COR" refers to Coefficient of Restitution, which is obtained by dividing a ball's rebound velocity by its initial (i.e., incoming) velocity. This test is performed by firing the samples out of an air cannon at a vertical steel plate over a range of test velocities (e.g., from 75 to 150 ft/s). A golf ball having a high COR dissipates a smaller fraction of its total energy when colliding with the plate and rebounding therefrom than does a ball with a lower COR.

The terms "points" and "compression points" refer to the compression scale or the compression scale based on the ATTI Engineering Compression Tester. This scale, which is well known to persons skilled in the art, is used in determining the relative compression of a center or ball.

The center may have, for example, a Shore D hardness of about 65 to about 80. The center may have, for example, a diameter of about 1.25 inches to about 1.5 inches. The base composition for forming the center may include, for example, polybutadiene and about 20 to 50 parts of a metal salt diacrylate, dimethacrylate, or monomethacrylate. If desired, the polybutadiene can also be mixed with other elastomers known in the art, such as natural rubber, styrene butadiene, and/or isoprene, in order to further modify the properties of the center. When a mixture of elastomers is used, the amounts of other constituents in the center composition are usually based on 100 parts by weight of the total elastomer mixture.

Metal salt diacrylates, dimethacrylates, and monomethacrylates include without limitation those wherein the metal is magnesium, calcium, zinc, aluminum, sodium, lithium or nickel. Zinc diacrylate, for example, provides golf balls with a high initial velocity in the United States Golf Association ("USGA") test.

Free radical initiators often are used to promote crosslinking of the metal salt diacrylate, dimethacrylate, or monomethacrylate and the polybutadiene. Suitable free radical initiators include, but are not limited to peroxide compounds, such as dicumyl peroxide; 1,1-di(t-butylperoxy) 3,3,5-trimethyl cyclohexane; bis (t-butylperoxy) diisopropylbenzene; 2,5-dimethyl-2,5 di (t-butylperoxy) hexane; or di-t-butyl peroxide; and mixtures thereof. The initiator(s) at 100 percent activity may be added in an amount ranging from about 0.05 to about 2.5 pph based upon 100 parts of butadiene rubber, or butadiene rubber mixed with one or more other elastomers. Often the amount of initiator added ranges from about 0.15 to about 2 pph, and more often from about 0.25 to about 1.5 pph. The golf ball centers may incorporate 5 to 50 pph of zinc oxide (ZnO) in a zinc diacrylate-peroxide cure system that cross-links polybutadiene during the core molding process.

The center compositions may also include fillers, added to the elastomeric composition to adjust the density and/or specific gravity of the center. Non-limiting examples of fillers include zinc oxide, barium sulfate, and regrind, e.g., recycled core molding matrix ground to about 30 mesh particle size. The amount and type of filler utilized is governed by the amount and weight of other ingredients in the composition, bearing in mind a maximum golf ball weight of 1.620 oz has been established by the USGA. Fillers usually range in specific gravity from about 2.0 to about 5.6. The amount of filler in the center may be lower such that the specific gravity of the center is decreased.

The specific gravity of the center may range, for example, from about 0.9 to about 1.3, depending upon such factors as the size of the center, cover, intermediate layer and finished ball, as well as the specific gravity of the cover and intermediate layer.

Other components such as accelerators, e.g., tetra methylthiuram, processing aids, processing oils, plasticizers, dyes and pigments, antioxidants, as well as other additives well known to the skilled artisan may also be used in amounts sufficient to achieve the purpose for which they are typically used.

Intermediate Layer(s)

The golf ball also may have one or more intermediate layers formed, for example, from dynamically vulcanized thermoplastic elastomers, functionalized styrene-butadiene elastomers, thermoplastic rubbers, thermoset elastomers, thermoplastic urethanes, TPEs, metallocene polymers, thermoset urethanes, ionomer resins, or blends thereof. For example, an intermediate layer may include a thermoplastic or thermoset polyurethane. Non-limiting examples of commercially available dynamically vulcanized thermoplastic elastomers include SANTOPRENE®, SARLINK®, VYRAM®, DYTRON®, and VISTAFLEX®. SANTOPRENE® is a dynamically vulcanized PP/EPDM. Examples of functionalized styrene-butadiene elastomers, i.e., styrene-butadiene elastomers with functional groups such as maleic anhydride or sulfonic acid, include KRATON FG-1901x and FG-1921x, which are available from the Shell Corporation of Houston, Tex.

Non-limiting examples of suitable thermoplastic polyurethanes include ESTANE® 58133, ESTANE® 58134 and ESTANE® 58144, which are commercially available from the Lubrizol Company of Cleveland, Ohio.

Examples of metallocene polymers, i.e., polymers formed with a metallocene catalyst, include those commercially available from Sentinel Products of Hyannis, Mass. Suitable thermoplastic polyesters include polybutylene terephthalate. Thermoplastic ionomer resins may be obtained by providing a cross metallic bond to polymers of monoolefin with at least one member selected from the group consisting of unsaturated mono- or di-carboxylic acids having 3 to 12 carbon atoms and esters thereof (the polymer contains 1 to 50 percent by weight of the unsaturated mono- or di-carboxylic acid and/or ester thereof). More particularly, low modulus ionomers such as acid-containing ethylene copolymer ionomers, include E/X/Y copolymers where E is ethylene, X is a softening comonomer such as acrylate or methacrylate. Non-limiting examples of ionomer resins include SURLYN® and LOTEK®, which are commercially available from DuPont and Exxon-Mobil, respectively.

Alternatively, the intermediate layer may be a blend of a first and a second component wherein the first component is a dynamically vulcanized thermoplastic elastomer, a functionalized styrene-butadiene elastomer, a thermoplastic or thermoset polyurethane or a metallocene polymer and the second component is a material such as a thermoplastic or thermoset polyurethane, a thermoplastic polyetherester or polyetheramide, a thermoplastic ionomer resin, a thermoplastic polyester, another dynamically vulcanized elastomer, another a functionalized styrene-butadiene elastomer, another a metallocene polymer or blends thereof. At least one of the first and second components may include a thermoplastic or thermoset polyurethane.

An intermediate layer also may be formed from a blend containing an ethylene methacrylic/acrylic acid copolymer. Non-limiting examples of acid-containing ethylene copolymers include ethylene/acrylic acid; ethylene/methacrylic acid; ethylene/acrylic acid/n- or isobutyl acrylate; ethylene/methacrylic acid/n- or iso-butyl acrylate; ethylene/acrylic acid/methyl acrylate; ethylene/methacrylic acid/methyl acrylate; ethylene/acrylic acid/iso-bornyl acrylate or methacrylate and ethylene/methacrylic acid/isobornyl acrylate or methacrylate. Examples of commercially available ethylene methacrylic/acrylic acid copolymers include NUCREL® polymers, available from DuPont.

Alternatively, an intermediate layer may be formed from a blend which includes an ethylene methacrylic/acrylic acid copolymer and a second component which includes a thermoplastic material. Suitable thermoplastic materials for use in the intermediate blend include, but are not limited to, polyesterester block copolymers, polyetherester block copolymers, polyetheramide block copolymers, ionomer resins, dynamically vulcanized thermoplastic elastomers, styrene-butadiene elastomers with functional groups such as maleic anhydride or sulfonic acid attached, thermoplastic polyurethanes, thermoplastic polyesters, metallocene polymers, and/or blends thereof.

The intermediate layer often has a specific gravity of about 0.8 or more. In some examples the intermediate layer has a specific gravity greater than 1.0, e.g., ranging from about 1.2 to about 1.3. Specific gravity of the intermediate layer may be adjusted, for example, by adding a filler such as barium sulfate, zinc oxide, titanium dioxide and combinations thereof.

The intermediate layer blend may have a flexural modulus of less than about 10,000 psi, often from about 5,000 to about 8,000 psi. The intermediate layers often have a Shore D hardness of about 35 to 50. The intermediate layer and core construction together may have a compression of less than about 65, often from about 50 to about 65. Usually, the intermediate layer has a thickness from about 0.020 inches to about 0.125 inches.

The golf balls may include a single intermediate layer or a plurality of intermediate layers. In the case where a ball includes a plurality of intermediate layers, a first intermediate layer may include, for example, a thermoplastic material having a hardness greater than that of the core. A second intermediate layer may be disposed around the first intermediate layer and may have a greater hardness than that of the first intermediate layer. The second intermediate layer may be formed of, but not limited to, materials such as polyether or polyester thermoplastic urethanes, thermoset urethanes, and ionomers such as acid-containing ethylene copolymer ionomers.

In addition, a third intermediate layer may be disposed in between the first and second intermediate layers. The third intermediate layer may be formed of the variety of materials as discussed above. For example, the third intermediate layer may have a hardness greater than that of the first intermediate layer. There may also be additional intermediate layers.

The Cover Layer

A golf ball also typically has a cover layer that includes one or more layers of a thermoplastic or thermosetting material. A variety of materials may be used such as ionomer resins, polyurethanes, balata and blends thereof. As described herein, at least one of the layers in the cover layer includes a crosslinkable thermoplastic polyurethane (TPU). The crosslinkable thermoplastic polyurethane is initially a thermoplastic, and while in this state may be melted and solidified repeatedly. Crosslinking generally increases hardness and, as described more fully below, may be controlled to impart desired properties to the cover and thus performance characteristics to the golf ball.

Polyurethanes typically are formed by reacting a polyol with a polyisocyanate. In some cases, the polyisocyanate is in the form of a polyurethane prepolymer formed by reaction between a polyether or polyester and a polyisocyanate. Two types of polyisocyanates are predominantly used to make polyurethanes, diphenylmethane diisocyanate monomer (MDI) and its derivatives, and toluene diisocyanate (TDI) and its derivatives.

MDI is the most widely used polyisocyanate. Both rigid and flexible foams, reaction injection moldings, elastomers, coatings, and casting compounds are made from MDI. There are three basic grades of MDI, polymeric MDI, pure MDI, and pure MDI derivatives. Pure MDI, which is produced from polymeric MDI, is a low-melting-temperature (about 100° F.) solid. Its primary use is in thermoplastic and cast elastomers. It also is used as an additive for synthetic fibers to achieve high fiber tenacity and elongation.

Pure MDI derivatives may be tailored to provide specific processing and reaction characteristics. A major use for these solvent-free liquids is in reaction injection molding (RIM), but they also find application in integral skin moldings, semi-flexible moldings, and cast elastomers. Toluene diisocyanate, TDI, is used primarily to make flexible foam, and also is used in elastomers, sealants, and coatings. TDI's generally are water-white liquids which have much higher isocyanate (—NCO) content than MDI and lower molecular weights. MDI and TDI also may be blended, particularly for producing flexible molded foams. The free-flowing, brown liquid blends usually have nearly as high isocyanate contents as does TDI.

There are two main types of polyols used in polyurethanes systems, polyesters and polyethers. Polyols are usually identified by their functionality. Functionality pertains to the number of reactive sites, which controls crosslinking. The more crosslinked (higher functionality), the more rigid the polyurethane. Functionality is controlled by the initiator used to manufacture the polyol. Glycerine, for example, is commonly used to initiate triol (3 functional) polyols. An oxide such as propylene oxide, ethylene oxide, or a combination, is often added to the initiator to extend the molecular chain and tailor final processing and performance characteristics of the polyol. Triols often are used to produce flexible foams, while diols commonly are used for elastomers, coatings, and sealants. Tetrols typically are used for rigid foams.

Polyether-based polyols have greater resistance to hydrolysis. Polyether polyols may be modified, for example, by in situ polymerization of acrylonitrile/styrene monomers. The resulting graft polyols generally produce flexible foams with improved load-bearing properties as well as greater tensile and tear strengths. Depending on the backbone on which these vinyl monomers are grafted, a wide range of performance characteristics may be developed.

Polyester polyols generally yield polyurethanes with greater strength properties, wear resistance, and thermal stability than polyether polyurethanes, and they can absorb more energy. Polyester polyols are typically classed by molecular weight. Low molecular weight polyols (e.g., less than 1500) are used in coatings, casting compounds, and rigid foams. Medium molecular weight polyols (e.g., 1550 to 2500) are often used in elastomers. High molecular weight polyols (e.g., greater than 2500) are typically used in flexible foams.

Although conventional TPUs do not readily crosslink, TPUs may be made crosslinkable by adjusting the chemistry and/or with the addition of co-agents. See, e.g., Limerkens et al. U.S. 2009/0197000 A1, the disclosure of which is hereby incorporated by reference in its entirety. Non-limiting examples of commercially available crosslinkable TPUs include Elastollan™ 1100, which are polyether-based thermoplastic polyurethanes available from BASF that exhibit excellent low temperature properties and hydrolysis resistance. These products can be injection and blow molded and extruded. Some grades are suitable for injection molding. When compounded with an appropriate co-agent, Elastollan™ may be crosslinked using irradiation. Other commercially available TPUs, such as Urepan™, may be used when combined with an appropriate co-agent, such as Liquiflex™, a hydroxyl terminated polybutadiene available from Petroflex.

In general, the thermoplastic polyurethane does not crosslink during molding, but may be crosslinked subsequent to molding by applying energy from a suitable source. Numerous ways are known to induce crosslinking in a polymer by free radical initiation, including peroxide initiation and irradiation. In some examples the TPU is crosslinked by irradiation, such as by gamma rays or ultraviolet (UV) irradiation. Other forms of particle irradiation, such as electron beam also may be used. The type of irradiation may be selected based on such factors as the composition of the underlying layers. For example, certain types of irradiation may degrade windings in a wound golf ball. On the other hand, balls with a solid core would not be subject to the same concerns. Some types of irradiation may tend to crosslink (and thus harden) the core. An appropriate source of irradiation may be selected depending upon whether such an effect is desired.

A photoinitiator typically is added to facilitate crosslinking by light energy, e.g., UV radiation. Non-limiting examples of UV initiators include ketones such as 1-hydroxycyclohexylphenylketone, 2,2-dimethoxy-1,2-diphenylethan-1-one, 1-[4-(2-hydroxyethoxy)-phenyl]-2-methyl-1-propanone (HHPMP), and (bis)acylphosphine-oxides such as bis(2,4,6-trimethylbenzoyl)-phenyl-phosphineoxide (BTPPO). The amount of photoinitiator typically ranges from about 0.1 to about 4 percent by weight of the composition, more usually from about 0.2 to about 2 percent by weight.

The cover may also contain other components in addition to the crosslinkable thermoplastic polyurethane. For example, one or more layers of the cover may be formed of a composition including very low modulus ionomers (VLMIs). As used herein, the term "very low modulus ionomers," refers to ionomer resins that further include a softening comonomer X, commonly a (meth)acrylate ester, present from about 10 weight percent to about 50 weight percent in the polymer. VLMIs are copolymers of an α-olefin, such as ethylene, a softening agent, such as n-butyl-acrylate or iso-butyl-acrylate, and an α,β-unsaturated carboxylic acid, such as acrylic or methacrylic acid, where at least part of the acid groups are neutralized by a magnesium cation or other cation. Other examples of softening comonomers include n-butyl methacrylate, methyl acrylate, and methyl methacrylate. Generally, a VLMI has a flexural modulus from about 2,000 psi to about 10,000 psi. VLMIs are sometimes referred to as "soft" ionomers.

Ionomers, such as acid-containing ethylene copolymer ionomers, include E/X/Y copolymers where E is ethylene, X is a softening comonomer such as acrylate or methacrylate present in 0 to 50 weight percent of the polymer, and Y is acrylic or methacrylic acid present in 5 to 35 (often 10 to 20) weight percent of the polymer, wherein the acid moiety is neutralized 1 to 90 percent (usually at least 40 percent) to form an ionomer by a cation such as lithium, sodium, potassium, magnesium, calcium, barium, lead, tin, zinc or aluminum, or a combination of such cations, lithium, sodium and zinc being the most preferred. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate.

To aid in the processing of the cover stock, ionomer resins may be blended in order to obtain a cover having desired characteristics. For this reason, the cover may be formed from a blend of two or more ionomer resins. The blend may include, for example, a very soft material and a harder material. Ionomer resins with different melt flow indexes are often employed to obtain the desired characteristics of the cover stock. SURLYN® 8118, 7930 and 7940 have melt flow indices of about 1.4, 1.8, and 2.6 g/10 min., respectively. SURLYN® 8269 and SURLYN® 8265 each have a melt flow index of about 0.9 g/10 min. A blend of ionomer resins may be used to form a cover having a melt flow index, for example, of from about 1 to about 3 g/10 min. The cover layer may have a Shore D hardness, for example, ranging from about 45 to about 70.

As another example, a thermoset cast polyurethane may be used. Thermoset cast polyurethanes are generally prepared using a diisocyanate, such as 2,4-toluene diisocyanate (TDI), methylenebis-(4-cyclohexyl isocyanate) (HMDI), or paraphenylene diisocyanate ("PPDI") and a polyol which is cured with a polyamine, such as methylenedianiline (MDA), or a trifunctional glycol, such as trimethylol propane, or tetrafunctional glycol, such as N,N,N',N'-tetrakis(2-hydroxypropyl)ethylenediamine. Other suitable thermoset materials include, but are not limited to, thermoset urethane ionomers and thermoset urethane epoxies. Other examples of thermoset materials include polybutadiene, natural rubber, polyisoprene, styrene-butadiene, and styrene-propylene-diene rubber.

When the cover includes more than one layer, e.g., an inner cover layer and an outer cover layer, various constructions and materials are suitable. For example, an inner cover layer may surround the intermediate layer with an outer cover layer disposed thereon or an inner cover layer may surround a plurality of intermediate layers. When using an inner and outer cover layer construction, the outer cover layer material may be a thermoset material that includes at least one of a castable reactive liquid material and reaction products thereof, as described above, and may have a hardness from about 30 Shore D to about 60 Shore D.

The inner cover layer may be formed from a wide variety of hard (e.g., about 65 Shore D or greater), high flexural modulus resilient materials, which are compatible with the other materials used in the adjacent layers of the golf ball. The inner cover layer material may have a flexural modulus of about 65,000 psi or greater. Suitable inner cover layer materials include the hard, high flexural modulus ionomer resins and blends thereof, which may be obtained by providing a cross metallic bond to polymers of monoolefin with at least one member selected from the group consisting of unsaturated mono- or di-carboxylic acids having 3 to 12 carbon atoms and esters thereof (the polymer contains 1 to 50 percent by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0-50 weight percent of the polymer, and Y is acrylic or methacrylic acid present in 5-35 weight percent of the polymer, wherein the acid moiety is neutralized about 1-90 percent to form an ionomer by a cation such as lithium, sodium, potassium, magnesium, calcium, barium, lead, tin, zinc, or aluminum, or a combination of such cations. Specific examples of acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate.

Non-limiting examples of other suitable inner cover materials that may be present include thermoplastic or thermoset polyetheresters, polyetheramides, or polyesters, dynamically vulcanized elastomers, functionalized styrene-butadiene elastomers, metallocene polymers, polyamides such as nylons, acrylonitrile butadiene-styrene copolymers (ABS), and blends thereof.

The crosslinkable TPU may be irradiated using any appropriate energy source, such as commercially available UV radiation sources. Because of the spherical shape of the golf ball, it is desirable to use devices that are capable of applying UV radiation to three dimensional surfaces. The level of radiation may be selected in accordance with the desired end characteristics of the cover. In general, higher levels of radiation and/or longer exposure times result in a higher degree of crosslinking (e.g., increased hardness), while lower levels of radiation and/or shorter exposure times result in a lower degree of crosslinking (e.g., less hardness and more elasticity). Dosage levels may vary over a wide range, but by way of example often may range up from about 1 to about 14 Mrads, more usually from about 2 to about 12 Mrads. In general, the amount of energy (and thus degree of crosslinking) may be controlled by adjusting one or more of the bulb type, exposure time, filtration, and exposure distance.

The composition of the cover layer and level of radiation may be selected to give a desired hardness, for example a Shore D hardness ranging from about 45 to about 75, often from about 50 to about 70. In general, crosslinking typically results in increasing Shore D hardness of the cover by 1-5 units as compared to the hardness before crosslinking.

Topcoat

The outer surface of the golf ball typically is painted with at least one clear or pigmented basecoat primer followed by at least one application of a clear topcoat. The clear topcoat may serve a variety of functions, such as protecting the cover material, improving aerodynamics of ball flight, preventing yellowing, and/or improving aesthetics of the ball.

One common topcoat utilizes a solvent borne two-component polyurethane, which is applied to the exterior of a golf ball. This topcoat formulation generally requires the use of a solvent that is a significant source of volatile organic compounds (VOC), which pose environmental and health concerns. Ultraviolet (UV) curable coatings generally do not require solvents. As described in co-pending and commonly owned U.S. patent application Ser. No. 12/470,820, the topcoat may be applied using a nitrogen- or nitrogen-enriched air delivery system. This pending U.S. patent application is entirely incorporated herein by reference.

Non-limiting examples of topcoats include thermoplastics, thermoplastic elastomers such as polyurethanes, polyesters, acrylics, low acid thermoplastic ionomers, e.g., containing up to about 15% acid, and UV curable systems. Additional additives optionally may be incorporated into the coating material, such as flow additives, mar/slip additives, adhesion promoters, thickeners, gloss reducers, flexibilizers, cross-linking additives, isocyanates, or other agents for toughening or creating scratch resistance, optical brighteners, UV absorbers, and the like. The amount of such additives usually ranges from 0 to about 5 wt %, often from 0 to about 1.5 wt %. The thickness of the topcoat typically ranges from of about 5 to about 25 µm, and in some examples ranges from about 10 to about 15 µm.

As described below, in some examples in which a UV curable topcoat is applied, the crosslinkable TPU in the cover composition and the UV curable topcoat may be simultaneously exposed to UV radiation such that the TPU is crosslinked and the topcoat is cured in a single step.

Manufacturing Process

Golf balls may be formed using a variety of techniques, such as injection molding, compression molding, retractable pin injection molding, vacuum forming, reaction injection molding, liquid injection molding, flow coating, and the like. One common technique for manufacturing golf balls is a laminate process. In order to form multiple layers around the center, a laminate is first formed. The laminate includes at least two layers and sometimes includes three layers. The laminate may be formed by mixing uncured core material to be used for each layer and calendar rolling the material into thin sheets. Alternatively, the laminate may be formed by mixing uncured intermediate layer material and rolling the material into sheets. The laminate sheets may be stacked together to form a laminate having three layers, using calender rolling mills. Alternatively, the sheets may be formed by extrusion.

A laminate also may be formed using an adhesive between each layer of material. For example, an epoxy resin may be used as adhesive. The adhesive should have good shear and tensile strength, for example, a tensile strength over about 1500 psi. The adhesive often has a Shore D hardness of less than about 60 when cured. The adhesive layer applied to the sheets should be very thin, e.g., less than about 0.004 inches thick.

Preferably, each laminate sheet is formed to a thickness that is slightly larger than the thickness of the layers in the finished golf ball. Each of these thicknesses can be varied, but all usually have a thickness of less than about 0.1 inches. The sheets should have very uniform thicknesses.

The next step in the method is to form multiple layers around the center. This may be accomplished by placing two laminates between a top mold and a bottom mold. The laminates may be formed to the cavities in the mold halves. The laminates then may be cut into patterns that, when joined, form a laminated layer around the center. For example, the laminates may be cut into FIG. 8-shaped or barbell-like patterns, similar to a baseball or a tennis ball cover. Other patterns may be used, such as curved triangles, hemispherical cups, ovals, or other patterns that may be joined together to form a laminated layer around the center. The patterns may then be placed between molds and formed to the cavities in the mold halves. A vacuum source often is used to form the laminates to the mold cavities so that uniformity in layer thickness is maintained.

After the laminates have been formed to the cavities, the centers are then inserted between the laminates. The laminates are then compression molded about the center under conditions of temperature and pressure that are well known in the art. The mold halves usually have vents to allow flowing of excess layer material from the laminates during the compression molding process. As an alternative to compression molding, the core and/or intermediate layer(s) may be formed by injection molding or other suitable technique.

The next step involves forming a cover around the golf ball core. The core, including center and intermediate layers, may be supported within a pair of cover mold-halves by a plurality of retractable pins. The retractable pins may be actuated by conventional means known to those of ordinary skill in the art.

After the mold halves are closed together with the pins supporting the core, the cover material is injected into the mold in a liquid state through a plurality of injection ports or gates, such as edge gates or sub-gates. With edge gates, the resultant golf balls are all interconnected and may be removed from the mold halves together in a large matrix. Sub-gating automatically separates the mold runner from the golf balls during the ejection of the golf balls from mold halves.

The retractable pins may be retracted after a predetermined amount of cover material has been injected into the mold halves to substantially surround the core. The liquid cover material is allowed to flow and substantially fill the cavity between the core and the mold halves, while maintaining concentricity between the core and the mold halves. The cover material is then allowed to solidify around the core, and the golf balls are ejected from the mold halves and subjected to finishing processes, including topcoating, painting, and/or other finishing processes, including processes in accordance with examples of this invention, as will be described in more detail below.

B. Specific Examples of Invention

Figure 2:
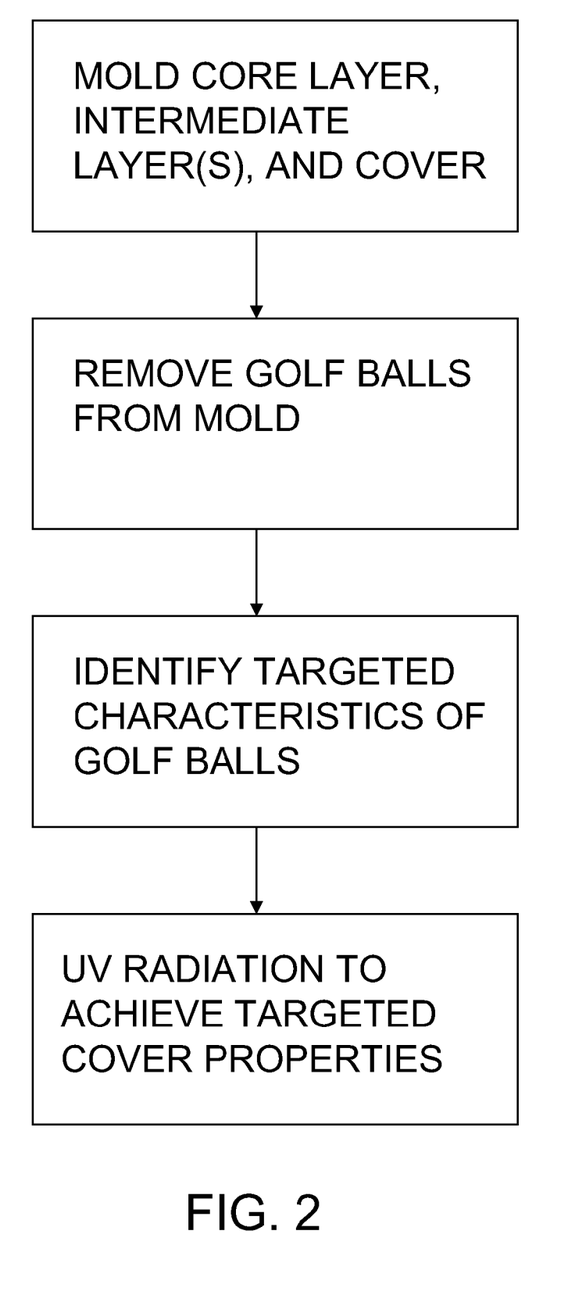
FIG. 2 is a process flow diagram illustrating one example of post-mold UV irradiation of thermoplastic polyurethane golf ball cover compositions.

With reference to FIG. 2, golf balls having a crosslinkable TPU in the cover layer may be molded according to techniques previously described to form a golf ball preform, and then removed from the mold. The golf ball preform may be stored for a period of time if desired. The shelf life of the preform (uncrosslinked golf ball) may vary depending on the compositions of the various layers, processing conditions, and the like. In most cases, the uncrosslinked golf balls may be stored up to about one year or more without any adverse effects. In some cases, precautions should be taken to minimize light and/or high temperature exposure during storage. After the targeted characteristics for the golf balls are identified, the golf balls may be subjected to an energy source, such as UV irradiation as previously described, to achieve the desired properties and performance characteristics for the golf balls. Optionally, indicia may be applied to the golf balls at that point, using known techniques, to identify the properties and performance characteristics. For example, a corresponding model designation may be affixed to the golf balls after the cover layer is crosslinked.

Figure 3:
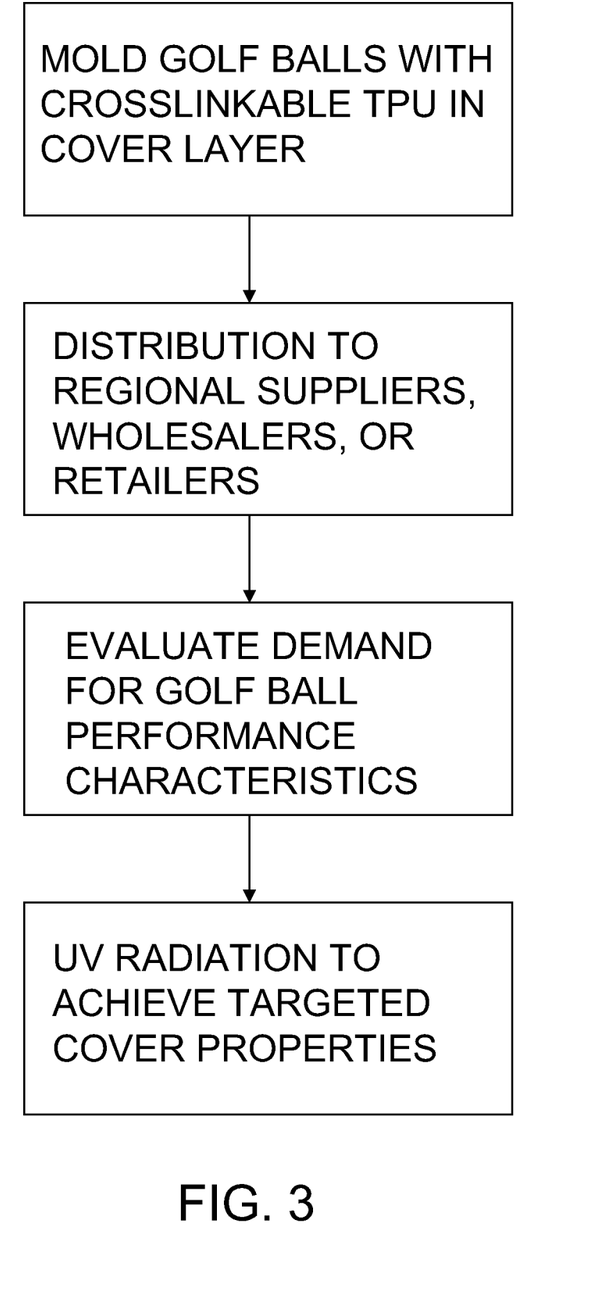
FIG. 3 is a process flow diagram illustrating an example of post-distribution UV irradiation of thermoplastic polyurethane golf ball cover compositions.

Post-mold crosslinking of the TPU in the cover layer offers a number of advantages. For example, as schematically illustrated in FIG. 3, golf balls may be first molded at a central manufacturing site and then distributed to regional suppliers, wholesalers, or possibly even further down the distribution chain such as to retailers or end users. The golf balls may be then stored for period of time (e.g., at least one day, one week, one month, 2-10 months, one year, or longer), until the demand for particular performance characteristics (e.g., distance, spin, hardness, etc.) for golf balls may be assessed for that region or location. The supplier, wholesaler, retailer, end user etc. may then irradiate the golf balls with an energy source, e.g., a commercially available UV energy source as previously described, under prescribed conditions to selectively crosslink the TPU to achieve the desired properties and performance characteristics. This provides the benefit of quickly adapting to changes in preferences or demand for particular characteristics of golf balls.

In some instances, the (uncrosslinked) golf ball preforms may be shipped to a third party prior to the step of irradiating. For example, a supplier, distributor, etc. may ship the preforms to a third party who carries out the irradiating step. In some examples, the golf ball preform may be packaged (e.g., in sleeves of 2, 3, or 4 balls, and/or in boxes of 12, 15, 18, or 24 balls) prior to irradiation. The golf ball preforms may be unpacked by a downstream entity (e.g., regional seller, wholesaler, retailer, ultimate customer, etc.), and then irradiated to get the properties desired by the consumer. Optionally, the balls may be repackaged after the irradiation step. Indicia may be applied to the golf balls and/or packaging material according to properties imparted to the golf balls by the irradiation step.

Figure 4:
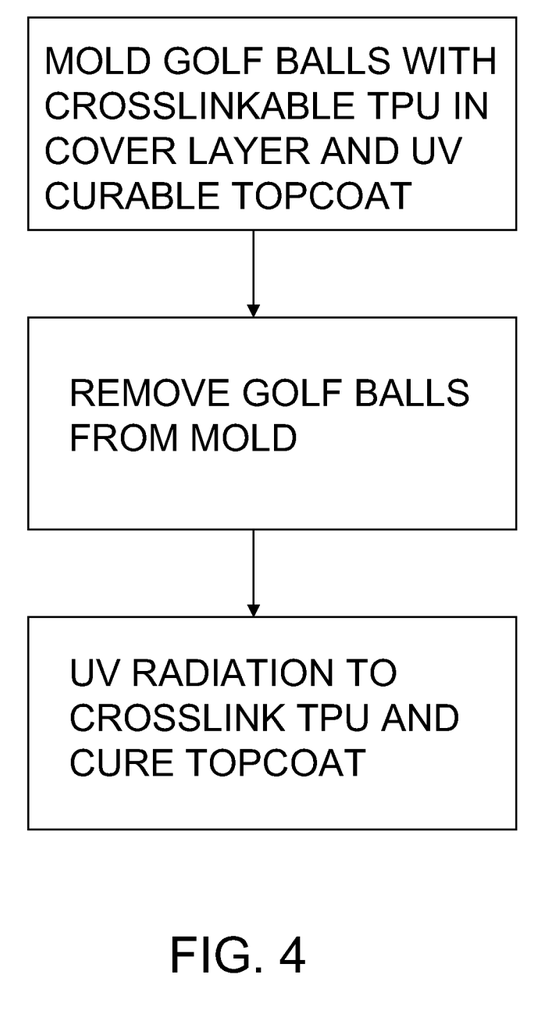
FIG. 4 is a process flow diagram illustrating an example of simultaneous post-mold UV irradiation of thermoplastic polyurethane in a cover composition and a UV curable topcoat.

In another aspect, the irradiation may be used to simultaneously treat one or more other components of the golf ball in addition to the crosslinkable TPU in the cover layer. For example, as schematically illustrated in FIG. 4, golf balls may be prepared having a crosslinkable TPU in the cover layer and a UV curable topcoat. Exposure of the golf balls to UV radiation under appropriate conditions may affect crosslinking of the TPU in the cover layer, as well as curing of the UV curable topcoat. Other components of the golf ball, such as the core and/or intermediate layer(s), may also contain materials which are affected by the radiation source. For example, some materials used in the core may be hardened when exposed to UV radiation.

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A method of preparing a multi-piece golf ball comprising:
   providing a core layer;
   providing a cover layer, wherein the cover layer comprises at least one crosslinkable thermoplastic polyurethane and a UV initiator;
   molding the cover layer and core layer to form a golf ball preform in a mold;
   removing the golf ball preform from the mold;
   applying an ultraviolet curable topcoat composition to the golf ball preform; and
   irradiating the golf ball preform with ultraviolet radiation under conditions sufficient to crosslink the crosslinkable thermoplastic polyurethane and cure the topcoat composition.

2. The method of claim 1 further comprising applying at least one intermediate layer between the core layer and the cover layer.

3. The method of claim 1 wherein the at least one intermediate layer comprises one or more dynamically vulcanized thermoplastic elastomers, functionalized styrene-butadiene elastomers, thermoplastic rubbers, thermoset elastomers, thermoplastic urethanes, metallocene polymers, thermoset urethanes, ionomer resins, or blends thereof.

4. The method of claim 1 wherein the cover layer further comprises a material selected from the group consisting of ionomer, thermoplastic, elastomer, urethane, balata, polybutadiene, and combinations thereof.

5. The method of claim 1 wherein the core layer is formed from a base composition comprising polybutadiene and about 20 to 50 parts of a metal salt diacrylate, dimethacrylate, or monomethacrylate.

6. The method of claim 5 wherein the base composition further comprises natural rubber, styrene butadiene, isoprene, or combinations thereof.

7. The method of claim 1 wherein the UV initiator in the cover layer is selected from the group consisting of 1-hydroxycyclohexylphenylketone; 2,2-dimethoxy-1,2-diphenylethan-1-one; 1-[4-(2-hydroxyethoxy)-phenyl]-2-methyl-1-propanone (HHPMP); bis(2,4,6-trimethylbenzoyl)-phenyl-phosphineoxide (BTPPO); and combinations thereof.

* * * * *